(12) United States Patent
Chou et al.

(10) Patent No.: US 9,118,944 B2
(45) Date of Patent: Aug. 25, 2015

(54) SYSTEM AND METHOD FOR RATE CONTROL IN A NETWORK ENVIRONMENT

(75) Inventors: Jim Chen Chou, San Jose, CA (US); Rui Zhang, Pleasanton, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 1473 days.

(21) Appl. No.: 12/366,599

(22) Filed: Feb. 5, 2009

(65) Prior Publication Data

US 2010/0195741 A1 Aug. 5, 2010

(51) Int. Cl.

| H04N 7/12 | (2006.01) |
| H04N 21/24 | (2011.01) |
| H04N 21/2343 | (2011.01) |
| H04N 19/147 | (2014.01) |
| H04N 19/115 | (2014.01) |
| H04N 19/132 | (2014.01) |
| H04N 19/156 | (2014.01) |
| H04N 19/174 | (2014.01) |
| H04N 19/187 | (2014.01) |
| H04N 19/36 | (2014.01) |

(52) U.S. Cl.
CPC ......... *H04N 21/2402* (2013.01); *H04N 19/115* (2014.11); *H04N 19/132* (2014.11); *H04N 19/147* (2014.11); *H04N 19/156* (2014.11); *H04N 19/174* (2014.11); *H04N 19/187* (2014.11); *H04N 21/234327* (2013.01); *H04N 19/36* (2014.11)

(58) Field of Classification Search
USPC ........................................ 375/240.16, 240.01
See application file for complete search history.

(56) References Cited

U.S. PATENT DOCUMENTS

| 2001/0028679 | A1* | 10/2001 | Chou ........................... 375/226 |
| 2003/0118097 | A1* | 6/2003 | Chen et al. ................. 375/240.2 |
| 2006/0209954 | A1* | 9/2006 | Wang et al. .............. 375/240.12 |
| 2007/0030898 | A1* | 2/2007 | Cote ....................... 375/240.12 |
| 2007/0206873 | A1* | 9/2007 | Schwenke et al. ............. 382/239 |
| 2008/0013633 | A1* | 1/2008 | Ye et al. ................... 375/240.24 |
| 2008/0025399 | A1* | 1/2008 | Le Leannec et al. ..... 375/240.16 |
| 2008/0137753 | A1* | 6/2008 | He ........................... 375/240.24 |
| 2008/0181302 | A1* | 7/2008 | Demircin et al. ........ 375/240.06 |
| 2008/0225955 | A1* | 9/2008 | Ridge et al. .............. 375/240.23 |
| 2008/0232452 | A1* | 9/2008 | Sullivan et al. .............. 375/232 |
| 2009/0028242 | A1* | 1/2009 | Kurauchi .................. 375/240.12 |
| 2009/0067491 | A1* | 3/2009 | Sun et al. ................. 375/240.03 |

OTHER PUBLICATIONS

Parrein et al., "Priority image and video encoding transmission based on a discrete radon transform" Packet Video 2007, pp. 105-112.*
Chia-Ming et al., "A comparative study on attention-based rate adaptation for scalable video coding" Image Processing (ICIP), 2009 16th IEEE International Conference on 2009 , pp. 969-972.*
Mathias Wien, Heiko Schwarz, and Tobias Oelbaum, "Performance Analysis of SVC," © 2007 IEEE, pp. 1194-1203.

* cited by examiner

*Primary Examiner* — Luu Pham
*Assistant Examiner* — Roderick Tolentino
(74) *Attorney, Agent, or Firm* — Patent Capital Group

(57) ABSTRACT

A method is provided in one example embodiment and includes receiving video data and gathering statistics associated with the video data. At least some of the video data is broken into slices, each of the slices representing a partition in a video frame within the video data. Each frame is encoded with one or more quality layers based on an outgoing rate and based on a number of central processing unit (CPU) cycles, wherein one or more quality layers of the frames are dropped in the encoding process. In more specific embodiments, the statistics relate to how many bits are used for encoding the quality layers of the video data and how much complexity is required for encoding the quality layers of the video data. After the statistics gathering, adjustments to a network rate are executed.

18 Claims, 2 Drawing Sheets

SYSTEM AND METHOD FOR RATE CONTROL IN A NETWORK ENVIRONMENT

TECHNICAL FIELD OF THE INVENTION

This invention relates in general to the field of communications and, more particularly, to a system and a method for rate control in a network environment.

BACKGROUND OF THE INVENTION

Networking architectures have grown increasingly complex in communication environments. This complexity has resulted in numerous protocols being implemented to direct packets in an efficient manner. For example, certain network elements may exchange packets in order to deliver video content to one or more end users. Note that with any such video traffic, rate control should be properly managed. The two most common parameters in this environment are bandwidth and latency.

The ability to offer a system or a protocol that offers an effective rate control for network elements provides a significant challenge to network designers, component manufacturers, service providers, and system administrators alike.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving video data and gathering statistics associated with the video data. At least some of the video data is broken into slices, each of the slices representing a partition in a video frame within the video data. Each frame is encoded with one or more quality layers based on an outgoing rate and based on a number of central processing unit (CPU) cycles, wherein one or more quality layers of the frames are dropped in the encoding process. In more specific embodiments, the statistics relate to how many bits are used for encoding the quality layers of the video data and how much complexity is required for encoding the quality layers of the video data. After the statistics gathering, adjustments to a network rate are executed. In other embodiments, a network rate is measured through a control layer, and the network rate is used to determine a number of quality layers to use for each of the frames.

In yet other embodiments, an amount of available CPU resources for a given frame translates into a number of quality layer partitions that are encoded, the resources being factored in the dropping of the quality layers and being maintained within a resource table that specifies an amount of resources required to process one quality layer partition. The number of quality layers allotted to a frame partition is based on operational rate distortion statistics that are calculated from previous frames. After an initial phase, a number of quality layers to each frame partition are allocated so that equal slopes are achieved among an operational rate-distortion curve for each of the slices.

Figure 1:
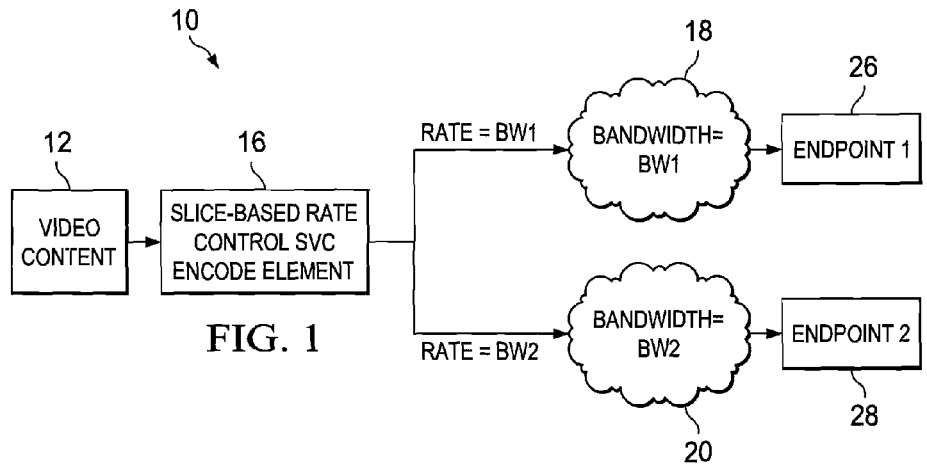
FIG. 1 is a simplified block diagram of a communication system for achieving optimal rate control in a network environment in accordance with one embodiment of the present invention.

Turning to FIG. 1, FIG. 1 is a simplified block diagram of a communication system 10 for achieving optimal rate control in a network environment. FIG. 1 includes a video content element 12 and a slice-based rate control scalable video codec (SVC) encode element 16, which is coupled to multiple bandwidth elements 18 and 20, which provide different bandwidth rates (BW1 and BW2) in this example. Also provided in FIG. 1 are several endpoints 26 and 28.

FIG. 1 may be generally configured or arranged to represent any communication architecture capable of exchanging packets in a network environment. Such configurations may include, for example, first generation, 2G, 2.5G, and 3G architectures that offer packet-exchanging capabilities for video data. In addition, communication system 10 may include any suitable networking protocol or arrangement that provides a communicative platform for communication system 10. Thus, communication system 10 may include a configuration capable of transmission control protocol/internet protocol (TCP/IP) communications for the transmission or reception of packets in a network. Communication system 10 may also operate in conjunction with a user datagram protocol/IP (UDP/IP) or any other suitable protocol where appropriate and based on particular needs.

For purposes of illustrating the techniques of communication system 10, it is important to understand the somewhat esoteric communications that may be traversing the network. The following foundational information may be viewed as a basis from which the described concept may be properly explained. Such information is offered earnestly for purposes of explanation only and, accordingly, should not be construed in any way to limit the broad scope of the described concept and its potential applications.

Note that with any video traffic, rate control is a significant concern. Typically, rate control problems are based on bandwidth and latency. The network determines how much traffic can be sent given some latency constraints. There should be some form of rate control on the video data or the audio data, or both. With new video standards (for example, SVC), there are added features of scalability available to administrators. For example, if more packets are added, parameters such as quality, spatial resolution, and temporal resolution can be accommodated.

In accordance with the techniques and teachings of the described concept, communication system 10 can leverage features of SVC to deliver improved quality for video communications. In one example implementation, communication system 10 can use slice-based rate control for the quality level to adjust to the rate. A second aspect of example embodiments of the present invention addresses complexity issues, as outlined below.

Thus, the problem successfully addressed (in example embodiments of the present invention) is one of rate control and complexity reduction via quality layer dropping for an H.264/SVC encoder. Rate control is necessary for adjusting the rate of a video bit-stream to be compatible with an endpoint's bandwidth and buffer size. Complexity reduction is often needed for video encoder implementations on embedded systems to maintain real-time encoding. Quality layer dropping for an H.264/SVC encoder may be used to address the above two problems without introducing drift into the encoded stream.

Figure 2:
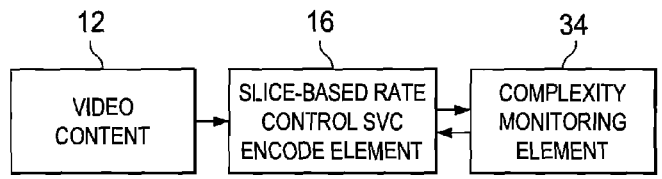
FIG. 2 is a simplified block diagram that illustrates a second case scenario for slice-based rate control in accordance with one embodiment of the present invention.

Example embodiments of the present invention can adapt the rate of an SVC stream to adjust to network rate constraints and application complexity constraints. FIG. 2 is a simplified block diagram that illustrates a second case scenario for slice-based rate control. FIG. 2 also includes a complexity monitoring element 34. In the second use case scenario of FIG. 2, there is a complexity monitoring tool that provides feedback for the encode element. The complexity monitoring tool is monitoring hardware/software resources that are being utilized in conjunction with the encoder. The last layers that are being encoded relate to the last hardware/software resources that were used. Hence, the complexity-monitoring tool can keep track of the number of resources needed to encode each additional layer. As resources are being constrained or over utilized, layers can be dropped to adapt to the resources that are available. In one example embodiment, encode element 16 and/or complexity monitoring element 34 may be included in a media gateway.

The method of adapting the rate may be achieved by adjusting the number layers used for quality scalability. There are two methods of achieving quality scalability within MPEG 4 Part 10 Annex G (i.e., H.264/SVC). The first method is referred to as Coarse Grain Scalability (CGS) and offers the same set of coding tools as Spatial Scalability, which implies that quality levels may only be switched at key frames. The second method is referred to as Medium Grain Scalability (MGS) and this method allows for switching between quality levels on a per slice basis. Because of the flexibility provided by MGS, intermediate network nodes that transport an SVC stream can often drop quality layers to adapt to downstream bandwidth conditions.

More specific to operational aspects of communication system 10, layers of slices can be dropped such that the architecture reuses the reconstruction [after dropping the layers of slices] to maximize the quality between the endpoints and SVC encode element 16. Note that one of the appeals of SVC is that quality layers may be dropped to adapt to a downstream rate. A disadvantage of doing so might be that it leads to drift between encoder and decoder. In example embodiments of the present invention, layers are dropped in the encoder to avoid drift, where the architecture can optimally allocate a number of layers to a given sub-frame. Furthermore, reference frames can be formed based on the highest reconstructed quality layer for each sub-frame.

The number of quality layer partitions that may be processed are pre-tabulated based on statistics from previous frames before the current frame is encoded. As a result, before a frame is encoded it can be known how many quality layer partitions may be used for the frame. Given the number of quality layer partitions that may be used, hardware or software (e.g., an algorithm) is used to divide the quality layers among the frame partitions. The algorithm attempts to equalize the slope of the operational rate-distortion curves of each frame partition. These activities are further detailed below.

Before turning to some of the operations of this architecture, a brief discussion is provided about some of the infrastructure of FIGS. 1 and 2. Endpoints 26 and 28 are clients or customers wishing to initiate a communication in communication system 10 via some network element. The term 'endpoint' may be inclusive of devices used to initiate a communication, such as a computer, a personal digital assistant (PDA), a laptop or electronic notebook, a cellular telephone, or any other device, component, element, or object capable of initiating voice, audio, or data exchanges within communication system 10. Endpoints 26 and 28 may also be inclusive of a suitable interface to the human user, such as a microphone, a display, or a keyboard or other terminal equipment. Endpoints 26 and 28 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, video, or script data, or any type of source or object code, or any other suitable information in any appropriate format that may be communicated from one point to another.

Each bandwidth element 18 and 20 represents some network connectivity. These networks may also include authentication features provided to the endpoints. The network could be a packet data network (PDN), a local area network (LAN), a wireless LAN (WLAN), a metropolitan area network (MAN), or a wide area network (WAN), a virtual private network (VPN), or any other appropriate architecture or system that facilitates communications in a network environment.

Video content element 12 is a content server in one example implementation, but could alternatively be any element or intermediary that delivers, serves, or otherwise provides content (video, audio, and/or any other suitable data) to one or more end users or endpoints.

Figure 3:
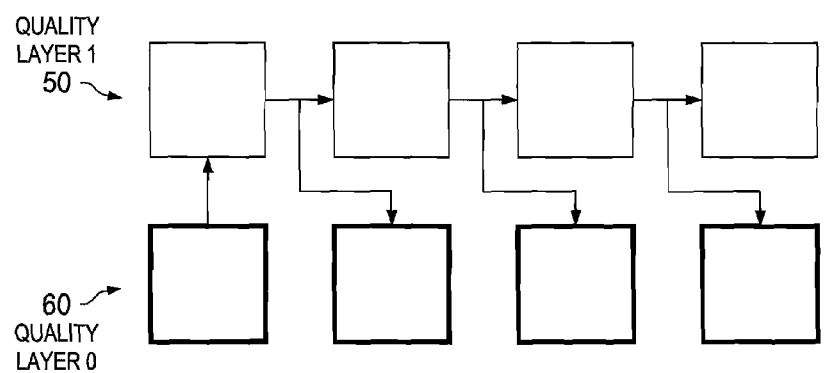
FIG. 3 is a simplified schematic diagram illustrating a quality layer prediction structure in accordance with one embodiment of the present invention.

FIG. 3 is a simplified schematic diagram illustrating a quality layer prediction structure. Quality layer 1 (50) is illustrated along with quality layer 0 (60) for purposes of simplification, as more quality layers could certainly be provided. In essence, this FIGURE is showing a prediction structure of how quality layers may be encoded. Layer 1 depends on layer 0, as the protocol is dependent in nature. Note that there should be an optimal coordination in dropping layers in order to effectively manage inputs and outputs for an encoder and a decoder. Thus, rate control should be accomplished in the context of end-to-end quality between encoder and decoder.

Quality layers can use the highest quality reconstructions for prediction (except for key frames). Dropping MGS layers will often lead to drift between the encoder and decoder due to the prediction structures that are used within MGS. A prominent prediction structure for MGS is based on using the highest reconstructed quality layer for prediction (as highlighted by FIG. 3).

In operation, the encoder can partition frames into slices and encode each slice using a varying amount of quality layers. Stated in other terms, the encoder may perform dropping of MGS layers, while intelligently encoding to avoid drift between the encoder and decoder to address:

1) rate control—Rate control is needed to match the receiving rate of the decoder. This could be achieved by adapting the quantization parameter at a frame or macroblock level. H.264/SVC provides a framework that allows layer dropping at a slice level, which can be achieved using less complex methods than are needed at a macroblock level, and provides finer rate-distortion control than operating at a frame level.
2) complexity—The variance of central processing unit (CPU) performance may often vary significantly depending on the input content. In order to maintain real-time performance, it is common practice to drop frames to adapt to complexity. In the H.264/SVC paradigm, quality layer slices may be dropped instead of frames to maintain finer control of quality versus performance.

Figure 4:
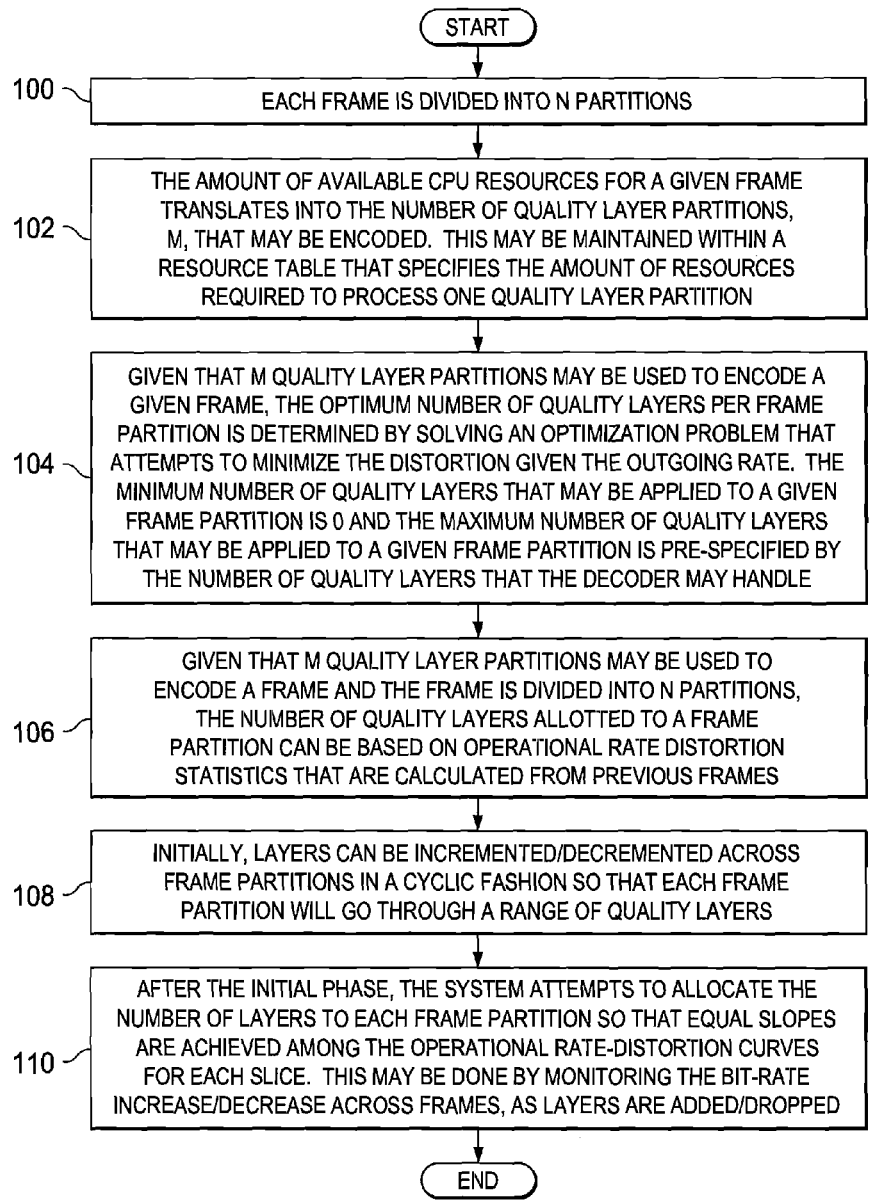
FIG. 4 is a simplified flowchart illustrating a series of example steps associated with the communication system.

Turning now to the example flow of FIG. 4, FIG. 4 is a simplified flowchart that includes a series of example steps associated with an operation of communication system 10. More specifically, FIG. 4 illustrates an example algorithm that can be used to manage complexity and rate control by dropping MGS slices. The illustration of FIG. 4 has been provided for purposes of teaching only and, therefore, should be construed as such. To determine the number of quality layers to encode for each frame, both the outgoing rate and the number of available CPU cycles should be taken into consideration. To address these issues, the following flow is proposed.

As the video content comes in, some form of statistics gathering occurs. For example, the architecture begins encoding with a different amount of layers for each slice. A slice is referred to as a partition in a video frame. At step 100, each frame is divided into n partitions. In a general sense, each slice can be thought of as a row. Each row may be encoded with a varying amount of layers. The purpose of this is to provide some statistical gathering of how many bits are required for encoding each layer and how much complexity is required for encoding each layer. After this initial training phase, the system can begin adjusting to the actual rate for the network. The rate of the network can be measured through a control layer. Given the rate, the algorithm can start trying to determine an optimal number of layers to use [per frame].

Thus, returning to the flow, at step 102, the amount of available CPU resources for a given frame translates into the number of quality layer partitions, m, that may be encoded. This may be maintained within a resource table that specifies the amount of resources required to process one quality layer partition.

At step 104, given that m quality layer partitions may be used to encode a given frame, the optimum number of quality layers per frame partition is determined by solving an optimization problem that attempts to minimize the distortion given the outgoing rate. The minimum number of quality layers that may be applied to a given frame partition is 0 and the maximum number of quality layers that may be applied to a given frame partition can be pre-specified by the number of quality layers that the decoder may handle. In one example, only the base layer is encoded. Heuristics can be applied to determine the number of quality layers used for encoding a frame partition.

At step 106, given that m quality layer partitions may be used to encode a frame and the frame is divided into n partitions, the number of quality layers allotted to a frame partition can be based on operational rate distortion statistics, which are calculated from previous frames. At step 108, initially, layers can be incremented/decremented across frame partitions in a cyclic fashion so that each frame partition can go through a range of quality layers.

At step 110, after the initial phase, the system attempts to allocate the number of layers to each frame partition so that equal slopes are achieved among the operational rate-distortion curves for each slice. This may be done by monitoring the bit-rate increase/decrease across frames, as layers are added/dropped.

Note that the curve measures the rate versus the actual distortion from dropping a single layer. In one example, a mathematical computation yields a protocol for dropping layers within each row of the video stream. Stated otherwise, it determines the optimal number of layers to encode each row within the video frame.

Thus, such a flow can use MGS quality layers to achieve quality scalability within an H.264/SVC bit-stream. The quality layers are typically dropped downstream of the encoder to adjust to the available bandwidth downstream of a network element (e.g., a router). For certain example embodiments of the present invention, it is proposed that the quality layers may be dropped within the encoding process to achieve rate-control and complexity reduction. For the case where quality layers are dropped downstream of an encoder, drift is generally introduced because the quality layers are encoded using an open-loop system. In communication system 10, drift is not introduced because the reconstructed frames can be based on the highest quality layer that is not dropped. Either constant bit rate (CBR) or variable bit rate (VBR) rate control may be performed without the need to adjust quantization parameters on a per-macroblock/frame basis. Quality layers can be dropped on a per-slice basis.

For complexity reduction, a moving average representing the number of cycles spent per macroblock may be kept. If the number of cycles per macroblock exceeds the macroblock budget needed for maintaining real-time encoding, then quality layers may be dropped. A statistic that indicates the number of cycles per macroblock for encoding each additional layer may also be maintained by using cycle counters available on an embedded platform. This cycle per macroblock statistic is useful in determining the number of layers that should be dropped to maintain real-time encoding.

In terms of advantages, rate control is important for adjusting to an endpoint's bandwidth and buffer size. The method outlined above allows for drift free rate control: without having to modify quantization parameters on a per frame/macroblock basis. Such an architecture can also allow for a method of achieving drift free complexity reduction.

In one example embodiment, encode element 16 and/or complexity monitoring element 34 are included in a media gateway, as outlined above. In other embodiments, these elements are included in any suitable network element. As used herein in this Specification, the term 'network element' is meant to encompass routers, switches, any type of gateways, bridges, loadbalancers, firewalls, or any other suitable device, component, element, or object operable to exchange information in a network environment. Moreover, these elements may include any suitable hardware, software, components, modules, interfaces, or objects that facilitate the operations thereof. This may be inclusive of appropriate algorithms (disclosed herein by way of one possible example) and communication protocols that allow for the effective exchange of data or information.

One or more tables may also be included in the network elements. In other embodiments, these tables may be provided externally to the network elements, or consolidated in any suitable fashion. The tables can be memory elements for storing information to be referenced by their corresponding network element. As used herein in this document, the term 'table' is inclusive of any suitable database or storage medium (provided in any appropriate format) that is capable of maintaining information pertinent to the video and/or processing operations of the proposed architecture. For example, the tables may store information in an electronic register, diagram, record, index, list, or queue. Alternatively, the tables may keep information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

In one example implementation, the network element (e.g., the media gateway) includes software to achieve the optimal rate control operations, as outlined herein in this document. In other embodiments, this feature may be provided external to the network element or included in some other network device to achieve this intended functionality. Alternatively, both the network element and some other network appliance include this software (or reciprocating software) that can coordinate in order to achieve the operations, as outlined herein. In still other embodiments, one or both of these devices may include any suitable algorithms, hardware, software, components, modules, interfaces, or objects that facilitate the operations thereof. This may be inclusive of appropriate communication protocols that allow for the effective exchange of data or information for achieving rate control in a network environment.

The network element (e.g., the media gateway) can also include memory elements for storing information to be used in achieving the rate control activities, as outlined herein. Additionally, each of these devices may include a processor that can execute software or an algorithm to perform the rate control activities, as discussed in this Specification. These network elements may further keep information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in FIG. 4 illustrate only some of the possible scenarios that may be executed by, or within, communication system 10. Some of these steps may be deleted or removed where appropriate, or these steps may be modified or changed considerably without departing from the scope of the described concept. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the described concept.

Although the described concept has been described in detail with reference to particular arrangements and configurations, these example configurations and arrangements may be changed significantly without departing from the scope of the described concept. For example, although the described concept has been described with reference to particular communication exchanges involving certain protocols (e.g., H.264/SVC), communication system 10 may be applicable to other protocols in which packets (not necessarily the packets described) are exchanged in order to provide video data to one or more endpoints.

Moreover, communication system 10 may be applicable to any suitable element or component within the network that seeks to control rate. The use of hardware in the previous discussions (e.g., a decoder and an encoder) may be replaced by any other element or combination of elements tasked with processing responsibilities for video and/or audio data. Furthermore, any application where there is a need to control rate may benefit from the teachings of communication system 10. In addition, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the described concept encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:
1. A method, comprising:
receiving video data at an encoding device;
gathering statistics associated with the video data, wherein at least some of the video data is broken into slices, each of the slices representing a partition in a video frame within the video data;
encoding, each frame with one or more quality layers, wherein an amount of the one or more quality layers is based on an outgoing rate that matches a receiving rate of a decoder, wherein an amount of available central processing unit (CPU) resources for a given frame translates into a number of quality layer partitions that are encoded;
allocating a number of quality layers to each frame partition after an initial phase so that equal slopes are achieved among an operational rate-distortion curve for each of the slices, wherein the number of quality layers allotted to a frame partition is based on operational rate distortion statistics that are calculated from previous frames; and
dropping one or more quality layers of the frames on a per slice basis in the encoding process, wherein the available CPU resources are factored in the dropping of the quality layers and the available CPU resources are maintained within a resource table that specifies an amount of resources required to process one quality layer partition.
2. The method of claim 1, wherein the statistics further relate to how much complexity is required for encoding the quality layers of the video data.
3. The method of claim 1, wherein, after the statistics gathering, adjustments to a network rate are executed.

4. The method of claim 1, wherein a network rate is measured through a control layer, and wherein the network rate is used to determine a number of quality layers to use for each of the frames.

5. The method of claim 1, wherein a moving average representing a number of cycles spent per macroblock is maintained and if the number of cycles per macroblock exceeds a macroblock budget needed for maintaining real-time encoding, then one or more quality layers are dropped in the encoding process.

6. The method of claim 1, wherein slices are dropped such that reconstruction data is reused after dropping the slices to control quality parameters between an endpoint and an encoder element.

7. An apparatus, comprising:
a memory element configured to store data;
a processor configured to execute instructions associated with the data;
a central engine configured to interface with the memory element and the processor, wherein the apparatus is configured for:
receiving video data at an encode element, wherein statistics associated with the video data are gathered, and wherein at least some of the video data is broken into slices, each of the slices representing a partition in a video frame within the video data;
encoding each frame with one or more quality layers based on an outgoing rate that matches a receiving rate of a decoder, wherein an amount of available central processing unit (CPU) resources for a given frame translates into a number of quality layer partitions that are encoded;
allocating a number of quality layers to each frame partition after an initial phase so that equal slopes are achieved among an operational rate-distortion curve for each of the slices, wherein the number of quality layers allotted to a frame partition is based on operational rate distortion statistics that are calculated from previous frames; and
dropping one or more quality layers of the frames on a per slice basis in the encoding process, wherein the available CPU resources are factored in the dropping of the quality layers and the available CPU resources are maintained within a resource table that specifies an amount of resources required to process one quality layer partition and wherein one or more quality layers of the frames are dropped on a per slice basis in an encoding process.

8. The apparatus of claim 7, wherein the statistics further relate to how much complexity is required for encoding the quality layers of the video data.

9. The apparatus of claim 7, wherein, after the statistics gathering, adjustments to a network rate are executed, and wherein the network rate is measured through a control layer, and wherein the network rate is used to determine a number of quality layers to use for each of the frames.

10. Logic encoded in one or more non-transitory tangible media that includes code for execution and when executed by a processor is configured to perform operations comprising:
receiving video data;
gathering statistics associated with the video data, wherein at least some of the video data is broken into slices each of the slices representing a partition in a video frame within the video data;
encoding each frame with one or more quality layers based on an outgoing rate that matches a receiving rate of a decoder, wherein an amount of available central processing unit (CPU) resources for a given frame translates into a number of quality layer partitions that are encoded;
allocating a number of quality layers to each frame partition after an initial phase so that equal slopes are achieved among an operational rate-distortion curve for each of the slices, wherein the number of quality layers allotted to a frame partition is based on operational rate distortion statistics that are calculated from previous frames; and
dropping one or more quality layers of the frames on a per slice basis in the encoding process, wherein the available CPU resources are factored in the dropping of the quality layers and the available CPU resources are maintained within a resource table that specifies an amount of resources required to process one quality layer partition.

11. The logic of claim 10, wherein the statistics further relate to how much complexity is required for encoding the quality layers of the video data, wherein, after the statistics gathering, adjustments to a network rate are executed.

12. The logic of claim 10, wherein a moving average representing a number of cycles spent per macroblock is maintained and if the number of cycles per macroblock exceeds a macroblock budget needed for maintaining real-time encoding, then one or more quality layers are dropped in the encoding process.

13. The logic of claim 10, wherein slices are dropped such that reconstruction data is reused after dropping the slices to control quality parameters between an endpoint and an encoder element, and wherein reference frames are formed based on a reconstructed quality layer for one or more subframes.

14. A system, comprising:
a complex monitoring device included in a media gateway, the complex monitoring device configured for:
gathering statistics associated with video data, wherein at least some of the video data is broken into slices, each of the slices representing a partition in a video frame within the video data; and
an encode device configured for:
encoding each frame with one or more quality layers based on an outgoing rate that matches a receiving rate of a decoder, wherein an amount of available central processing unit (CPU) resources for a given frame translates into a number of quality layer partitions that are encoded;
allocating a number of quality layers to each frame partition after an initial phase so that equal slopes are achieved among an operational rate-distortion curve for each of the slices, wherein the number of quality layers allotted to a frame partition is based on operational rate distortion statistics that are calculated from previous frames; and
dropping one or more quality layers of the frames on a per slice basis in the encoding process, wherein the available CPU resources are factored in the dropping of the quality layers and the available CPU resources are maintained within a resource table that specifies an amount of resources required to process one quality layer partition, wherein one or more quality layers of the frames are dropped on a per slice basis in the encoding process.

15. The system of claim 14, wherein the statistics further relate to how much complexity is required for encoding the quality layers of the video data.

16. The system of claim 14, wherein, after the statistics gathering, adjustments to a network rate are executed.

17. The system of claim 14, wherein a network rate is measured through a control layer, and wherein the network rate is used to determine a number of quality layers to use for each of the frames.

18. The system of claim 14, wherein reference frames are formed based on a reconstructed quality layer for one or more sub-frames.

* * * * *